United States Patent
Hattori et al.

(10) Patent No.: US 6,760,291 B2
(45) Date of Patent: Jul. 6, 2004

(54) METHOD AND APPARATUS FOR INITIALIZING OPTICAL RECORDING MEDIA

(75) Inventors: Kyohji Hattori, Tokyo (JP); Kenichi Aihara, Tokyo (JP); Katsuyuki Yamada, Tokyo (JP); Fumiya Ohmi, Tokyo (JP); Eiji Noda, Tokyo (JP); Yujiro Kaneko, Tokyo (JP); Yuki Nakamura, Tokyo (JP); Hiroko Iwasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/372,343

(22) Filed: Feb. 25, 2003

(65) Prior Publication Data
US 2003/0152003 A1 Aug. 14, 2003

Related U.S. Application Data

(60) Continuation of application No. 10/078,423, filed on Feb. 21, 2002, now Pat. No. 6,580,672, which is a division of application No. 09/199,472, filed on Nov. 25, 1998, now Pat. No. 6,373,802.

(30) Foreign Application Priority Data

Mar. 12, 1998 (JP) ............................................. 10-60755
Nov. 27, 1998 (JP) ........................................... 09-325808

(51) Int. Cl.$^7$ ................................................. G11B 7/00
(52) U.S. Cl. ............................... 369/53.22; 369/53.37; 369/47.55
(58) Field of Search ................................ 369/116, 47.5, 369/47.51, 47.55, 53.22, 53.37

(56) References Cited

U.S. PATENT DOCUMENTS

| | | | |
|---|---|---|---|
| 4,679,180 A | | 7/1987 | Kryder et al. |
| 5,195,080 A | | 3/1993 | Komaki et al. |
| 5,398,227 A | | 3/1995 | Miyaoka et al. |
| 5,724,328 A | | 3/1998 | Yanagi |
| 5,790,491 A | | 8/1998 | Jaquette et al. |
| 5,991,251 A | * | 11/1999 | Sakurai et al. ................ 369/54 |
| 6,256,286 B1 | | 7/2001 | Ogawa |

FOREIGN PATENT DOCUMENTS

| | | |
|---|---|---|
| JP | 3-272022 | 12/1991 |
| JP | 7-192266 | 7/1995 |
| JP | 9-312036 | 12/1997 |

\* cited by examiner

*Primary Examiner*—Nabil Hindi
(74) *Attorney, Agent, or Firm*—Dickstein Shapiro Morin & Oshinsky LLP

(57) ABSTRACT

A method and apparatus for initializing optical recording media is provided that detects the intensity of a reflective light off of an optical recording media and analyzes the initializing condition based on the detected intensity during an initializing process. The light is radiated on a rotating phase-change optical recording medium. The light may be moved in a radial direction of the optical recording medium. The detected intensity of the reflected light may be used to identify crystallized portions and amorphous portions of the optical media. The initialization process can be adaptively controlled to ensure proper initialization. If desired, re-initialization can be limited to those areas detected to be outside of the predetermined parameters.

11 Claims, 5 Drawing Sheets

METHOD AND APPARATUS FOR INITIALIZING OPTICAL RECORDING MEDIA

This application is a continuation of U.S. application Ser. No. 10/078,423 filed on Feb. 21, 2002 now U.S. Pat. No. 6,580,672, which in turn is a divisional of app. Ser. No. 09/199,472 filed Nov. 25, 1998 now U.S. Pat. No. 6,373,802 issued Apr. 16, 2002. The entire disclosure of U.S. application Ser. No. 10/078,423 and U.S. Pat. No. 6,373,802 is expressly incorporated by reference herein.

BACKGROUND OF THE INVENTION

A. Field of the Invention

The present invention relates to an apparatus and method for initializing an optical recording media. The present invention also relates to an initializing apparatus for changing an amorphous recording layer of an optical disc into a crystal recording layer. The invention may be used to manufacture phase-change optical recording media. The present invention also relates to a system for verifying uniform crystallization of phase-change optical recording media.

B. Description of the Related Art

In optical recording discs with rewrite capability, such as a CD-RW phase-change optical recording disc, a first dielectric layer, a recording layer, a second dielectric layer and a metal layer are formed on a disc substrate. The substrate is generally made of polycarbonate. A UV hardening layer may be provided on the metal layer.

The phase-change recording material of the CD-RW optical disc transitions into either (1) a crystal condition by lengthening the cooling time after it has been heated, or (2) an amorphous condition by shortening the cooling time after it has been melted. Phase-change recording media can record information in the form of marks by reversibly changing between the crystal condition and the amorphous condition. A recording signal can be used to change the intensity of the optical beam that is radiated on the recording layer to change the recording layer from a crystal condition to an amorphous condition, or vice versa. When forming marks, the optical beam intensity may be set at the amorphous level. On non-mark portions, the intensity of the optical beam intensity is set at the crystal level, and the recording layer is crystallized. Since non-mark portions are not heated as much and cool slowly, they transition into the crystal condition regardless of whether they were in an amorphous condition or in a crystal condition.

On the other hand, when manufacturing phase-change recording media, the recording layer is left in an amorphous condition after spattering. Therefore, it is necessary to crystallize all of the recording layer. This crystallization process is called the initialing process. As mentioned above, the length of the cooling time effects the transition to either the crystal condition or the amorphous condition. When the cooling time is longer, the recording layer transitions into the crystal condition. When the cooling time is shorter, the recording layer transitions into the amorphous condition. Therefore, in the initializing process of the recording layer, an optical beam is radiated on the recording layer and the cooling time is made longer after raising the temperature of the recording layer.

Because the substrate is generally made from polycarbonate, it is possible to exceed the heat-resisting properties of the material if the entire surface is initialized simultaneously. The initializing process is generally carried out by radiating an optical beam on the optical recording media while rotating the optical recording media. Successive portions of the recording layer are crystallized as the radiating position is moved in the radial direction.

One problem with the above-described scanning system is that any instability in the optical beam can result in incomplete crystal portions on the recording layer. If there are incomplete crystal portions, problems with recording and reproducing signals are caused, and it is impossible to record and reproduce information accurately.

SUMMARY OF THE INVENTION

It is therefore an object of the present invention to provide an initializing method and apparatus for determining if a recording layer of a phase-change optical recording disc is uniformly crystallized.

It is another object of the present invention to provide an initializing method and apparatus that can uniformly crystallize a recording layer of a phase-change optical recording disc.

In one aspect of the invention, the intensity of light reflected off of the optical recording media is detected. Based on the intensity of the reflected light, a judgement is made as to whether the initializing condition is acceptable or not. According to this aspect of the invention, the light used for initializing may be radiated on a rotating phase-change optical recording medium. The radiating position of the light may be moved radially relative to the optical recording medium In another aspect of the invention, the intensity of the reflective light of the optical recording media is detected and the driving power of an initializing light source is adaptively adjusted. The initializing light radiated by the light source may be based on the intensity of the reflective light.

In another aspect of the invention, the intensity of the reflective light off of the optical recording media is detected and the rotation speed of the optical recording media and the relative moving speed of the initializing light in the radial direction of the optical recording process is adjusted as a function of the intensity of the reflective light. The intensity detection and speed adjustment steps may occur during the initialization process.

In another aspect of the invention, an initializing apparatus comprises: a driving means that drives an initializing light source for radiating the initializing light on optical recording media; a rotating means for rotating the optical recording media; a moving means for moving the radiating position from the initializing light source against the optical recording media in a radial direction; a detecting means for detecting the intensity of the reflective light of the optical recording media in initializing action of the optical recording media; and an analyzing means for determining if initializing conditions are acceptable or not based on the detected intensity of the reflective light.

In another embodiment of the invention, an initializing apparatus comprises: a driving means which drives an initializing light source for radiating the initializing light on optical recording media; a rotating means for rotating the optical recording media; a moving means for moving the radiating position from the initializing light source against the optical recording media in a radial direction; a detecting means for detecting intensity of the reflective light of the optical recording media in initializing action of the optical recording media; and an adjusting means for adjusting the driving power of the initializing light source based on the detected intensity of the reflective light of the optical recording media.

In another embodiment, an initializing apparatus comprises: a driving means which drives an initializing light source for radiating the initializing light on optical recording media; a rotating means for rotating the optical recording media; a moving means for moving relatively the radiating position from the initializing light source against the optical recording media in a radial direction; a detecting means for detecting the intensity of the reflective light of the optical recording media in initializing action of the optical recording media; and an adjusting means for adjusting a rotating speed of the optical recording media and the relative moving speed between the radiating position of the initializing light source and the optical recording media based on the detected intensity of the light reflected by the optical recording media.

In another aspect of the invention, the intensity of the reflective light is detected based on the reflection of the light radiated on the optical recording media.

In another aspect of the invention, the intensity of the reflective light is detected based on the reflection of the light radiated on the optical recording media by a second light source different from the light source used for initializing.

In another aspect of the invention, the intensity of the reflected light is determined and analyzed, the system responds accordingly, and the initialization process is repeated.

In another aspect of the invention, a determination is made as to whether the optical recording medium was inadequately initialized. The determination may be made during or after the initialization process.

In another aspect of the invention, the driving power of the initializing light source is monitored and actively adjusted to prevent poor initializing conditions.

In another aspect of the invention, the rotation speed of the optical recording media and the relative moving speed of the initializing light in the radial direction of the optical recording media are actively adjusted to prevent poor initializing conditions.

In another aspect of the invention, optical focusing servo and tracking servo systems may be employed.

In another aspect of the invention, information on the reflective light intensity is obtained by an exclusive optical arrangement independent of the reflective optical arrangement for the focusing servo and the tracking servo. This feature may be used to improve the reliability of the reflective light intensity information.

In another aspect of the invention, to carry out an initializing process, an initializing light source radiates an initialization light on the rotating phase-change optical recording media, and the radiation position is moved relatively in the radial direction of the optical recording media. The intensity of the reflective light of the optical recording media is detected. Based on the detected result, a determination is made as to whether the initializing condition is acceptable or not. The intensity of the reflective light may be detected during or after the initializing process.

In another aspect of the invention, to carry out an initializing process, an initializing light from the initializing light source is radiated on the rotating phase-change optical recording media, and the radiation position is relatively moved in the radial direction of the optical recording media. The intensity of the reflective light of the optical recording media is detected, and the driving power of the initializing light source is adaptively adjusted based on the detected result to prevent poor initializing conditions.

In another aspect of the invention, an initializing light from the initializing light source is radiated on the rotating phase-change optical recording media, and the radiation position is relatively moved in the radial direction of the optical recording media. The intensity of the reflective light of the optical recording media is detected, and the rotating speed of the optical recording media and the relative moving speed of the initializing light in the radial direction of the optical recording media are adaptively adjusted based on the detected result to prevent poor initializing conditions.

With these and other objectives, advantages and features of the invention that may become apparent, the nature of the invention may be more clearly understood by reference to the following detailed description, the appended claims, and the accompanying drawings.

DESCRIPTION OF PREFERRED EMBODIMENTS

Preferred embodiments of the present invention are described in detail with reference to the accompanying drawings.

Figure 1:
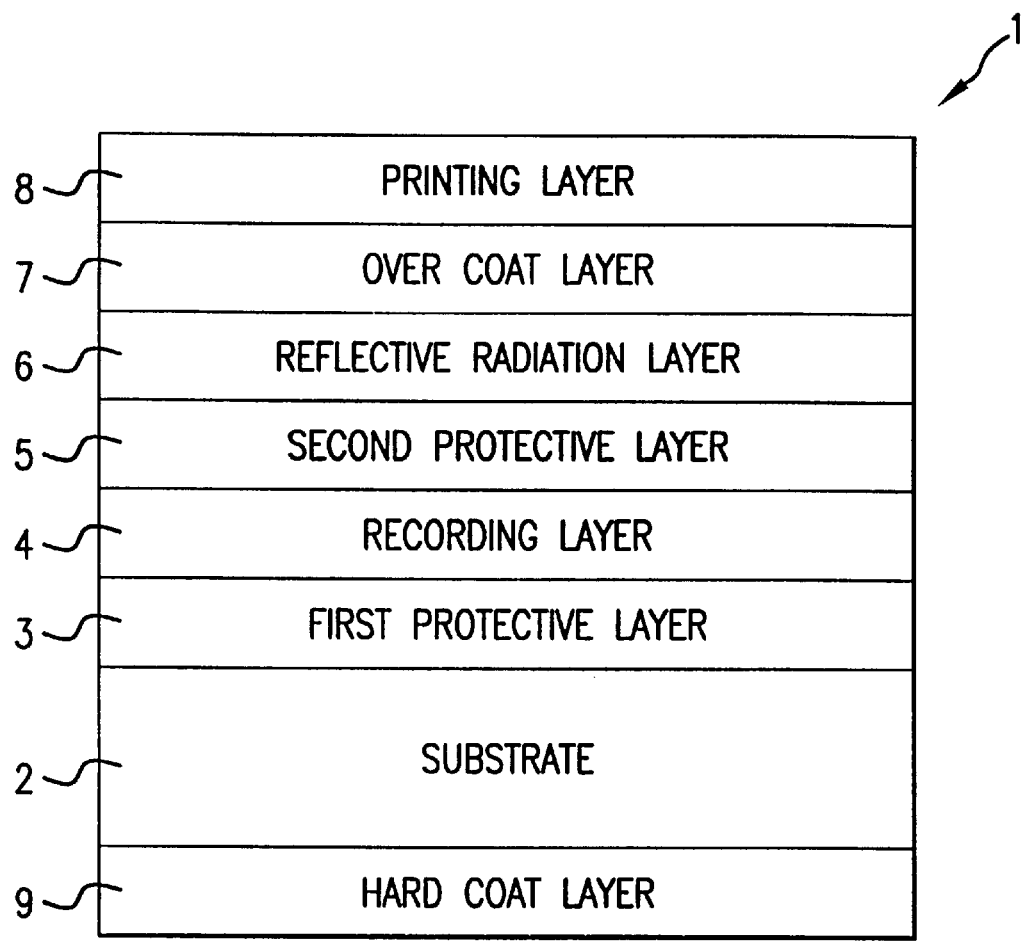
FIG. 1 is a diagram of a laminate structure of an optical recording media constructed in accordance with the invention.

FIG. 1 shows the laminate structure of a phase-change optical disc 1. The optical disc 1 is formed from a first protective layer 3, a recording layer 4, a second protective layer 5, a reflective layer 6, an overcoat layer 7, and a printing layer on the surface of the substrate 2. A hard coat layer 9 is coated on the opposite surface of the substrate 2. The substrate 2 may be composed of polycarbonate or acrylic resin. The desired material may be selected based on optical characteristics, forming characteristics and cost considerations. The desirable thickness is 1.2 mm or 0.6 mm.

The substrate 2 is not limited to a disc shape and may be a card form, sheet or other form. In addition, it is expressly contemplated that other phase-change products may be used. The present invention is not limited to the particular optical disc described herein but may be used with other phase-change optical recording media.

The first protective layer 3, the recording layer 4, the second protective layer 5 and the radiation reflective layer 6 can be formed as films by spattering techniques. These films may have thicknesses of 65–130 nm, 15–35 nm, 15–45 nm and 7–180 nm, respectively. The recording layer 4 is composed of a phase-change recording material, and transitions into a crystal condition when it is slowly cooled after it is melted, and transitions into an amorphous condition when cooled immediately after heating. After spattering, the recording layer 4 is in an amorphous condition.

The over coat layer 7 has a 7–15 micro-meter ($\mu$m) thickness and is formed on the reflective layer 6. The printing layer 8 may be formed after initializing the recording layer 4.

The recording layer 4 is heated by light radiated onto the substrate 2 from the side of the hard coat layer 9. When the cooling time of the recording layer 4 is made longer after it has been heated, the recording layer 4 transitions into a crystal condition. When the cooling time of the recording layer 4 is made shorter after it has been heated, the recording layer 4 transitions into an amorphous condition.

Figure 2:
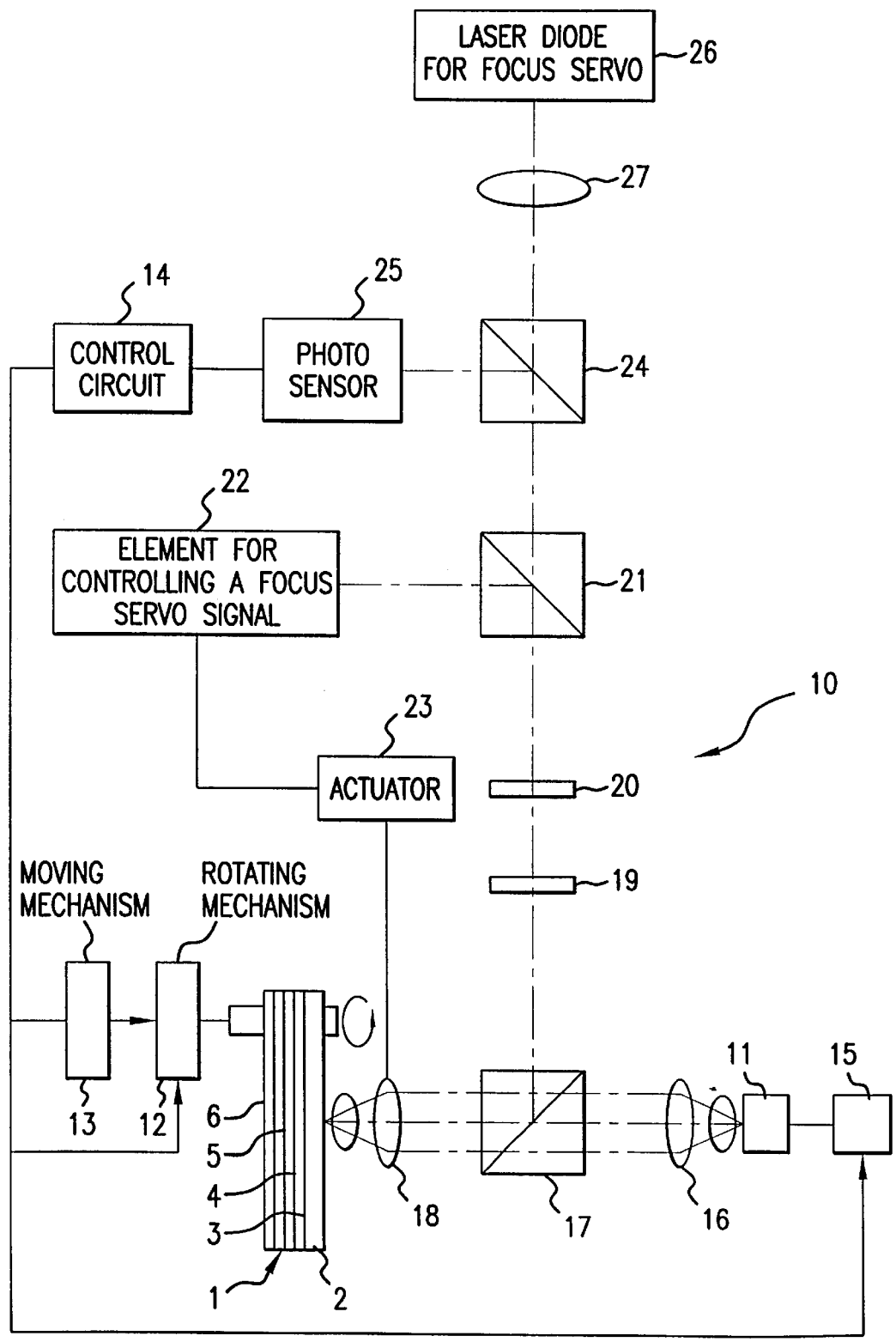
FIG. 2 is a diagram of an initializing apparatus.

FIG. 2 shows an initializing apparatus 10. The initializing apparatus 10 may use a laser diode 11 as an optical resource for the initialization process. A rotating mechanism 12 is provided that includes a driving resource and a moving mechanism 13. The laser diode may be substituted with another suitable source including, but not limited to, an electron beam, X-rays, ultraviolet rays, visible rays, infrared rays, or microwaves.

A laser diode 11 is advantageous because it is compact and its power can be controlled easily. The rotating mechanism 12 drives and rotates the optical disc 1 based on commands from the control circuit 14 of the microcomputer. The moving mechanism 13 makes the optical disc 1 move in a perpendicular direction against the rotating shaft based on commands from the control circuit 14, and makes the focusing position of the laser beam from the laser diode 11 move in a radial direction relative to the disc 1.

The laser diode 11 may be driven by a laser diode power supplier 15, which is controlled by the control circuit 14. Laser rays from the laser diode 11 are made parallel by the collimator lens 16, polarized by the polarizing beam split means 17, and focused on the optical disc 1 by the objective lens 18. Reflective rays from the optical disc 1 are deflected at a right angle by the polarizing beam split means 17, deflected at a right angle again by a filter 19, pass through a quarter-wave plate 20, pass through a polarizing beam split means 21, and then are radiated into element 22 for controlling the focus servo signal. An actuator 23 adjusts the objective lens 18 in the direction of the ray axis and adjusts the servo focus.

The initializing apparatus 10 has a beam split means 24 which deflects the polarized laser beam going straight to the polarizing beam split means 21 at right angles. The laser beam polarized at right angles by the beam split means 24 is received by a photo sensor 25. An electromotive force is generated in the photo sensor 25 in response to the intensity of the received light. The electromotive force is converted into a digital value and input to the control circuit 14. The control circuit 14 retains data on the optimum maximum value and minimum value of the electromotive force. The stored data may be based on collected electromotive force data for the optical disc 1. A determination is made as to whether the disc 1 is a good one or not based on whether the output signal value from the photo sensor 25 is between the maximum value and the minimum value.

Furthermore, the initializing apparatus 10 has a laser diode 26 for the focus servo. The laser beam radiated from the laser diode 26 is changed into a parallel beam by the collimator lens 27 and then goes to the polarizing beam split means 21 before reaching the optical disc 1.

To initialize the recording layer 4, the optical disc 1 is rotated by the rotating mechanism 12 and moved in a radial direction by the moving mechanism 13. The focus position of the laser beam radiated from the laser diode 11 moves in a radial direction. The laser beam from the laser diode 11 is radiated on the optical disc 1 and the recording layer 4 is heated. The recording layer 4 transitions into the crystal condition by slowly cooling after heating.

If the thickness and other properties of the recording layer 4 are not uniform, there are portions that may require a higher laser beam power for adequate heating and melting and portions that require a lower laser beam power. Even if the cooling speed is equal, there may be crystal portions and amorphous portions. According to the present invention, in order to achieve a uniform property in the optical disc 1, and to achieve the desired initialization, the reflective rate of the optical disc 1 is monitored during the initializing step and adjustments are carried out. The well melted portions of the optical disc 1 will be well crystallized and the reflective rate will be high. On the other hand, the reflective rate of the optical disc 1 is saturated when exceeding a certain initializing power. When the cooling speed is fast, the recording layer 4 becomes amorphous and the reflective rate is sharply reduced. It is thus possible to monitor the initialization process by correlating reflective rate with crystallized/amorphous portions. In the present embodiment, the control circuit 14 monitors the output from the photo sensor 25 to determine if it is between the predetermined maximum value and the predetermined minimum value, and determines if the initializing condition of the optical disc 1 is acceptable or not.

Instead of varying the laser beam intensity, or in addition to, adjustments to the driving power of the laser diode 11 by the laser diode power supplier 15, and/or to the driving speed of the rotating mechanism 12, and/or to the moving mechanism 13 can be carried out by control of the control circuit 14. Thus, when the reflective rate is determined to be low, the control circuit 14 returns the results to the laser diode power supplier 15 to make the reflective rate higher. On the other hand, when the reflective rate is too high, the laser diode driving power supplier 15 can act to reduce the laser power. It is thus possible to raise or lower the reflective rate and ensure adequate initialization.

The whole surface of the optical disc 1 can be scanned to determine if the output of the photo sensor 25 exceeds the minimum value. For example, if there is a sharp decline in the reflective rate or if the average reflective rate of the optical disc 1 is under 70%, which shows the optical disc 1 is in a partially amorphous condition, the rotating mechanism 12 and the moving mechanism 13 can be adjusted accordingly. The rotating speed and the moving speed of the optical disc 1 can be adaptively slowed to prevent the recording layer 4 from transitioning to an amorphous condition.

If the control circuit 14 recognizes that there is an amorphous portion on the optical disc and/or the reflective rate is too high and/or too low based on the result of the monitoring after initializing once, the initializing process for the whole optical disc 1 can be repeated. The driving power of the laser diode 11 by the laser diode power supplier 15 and/or the rotating speed and/or the moving speed of the optical disc 1 by the rotating mechanism 12 and/or the moving mechanism 13 can be adjusted accordingly. Therefore, non-uniformity of the reflective rate is reduced and the generated amorphous portions are crystallized.

Alternately, since re-initialization is time consuming, the results of the initialization monitoring can be used to calculate the radial value of the optical disc 1 corresponding to amorphous, or potentially amorphous, regions. Parameters may be automatically determined to initialize only portions requiring re-initializing.

The photo sensor 25 of the present invention monitors a reflective light from the optical disc 1 for focusing servo. However, an exclusive light source for monitoring the initializing process also can be provided.

Figure 4:
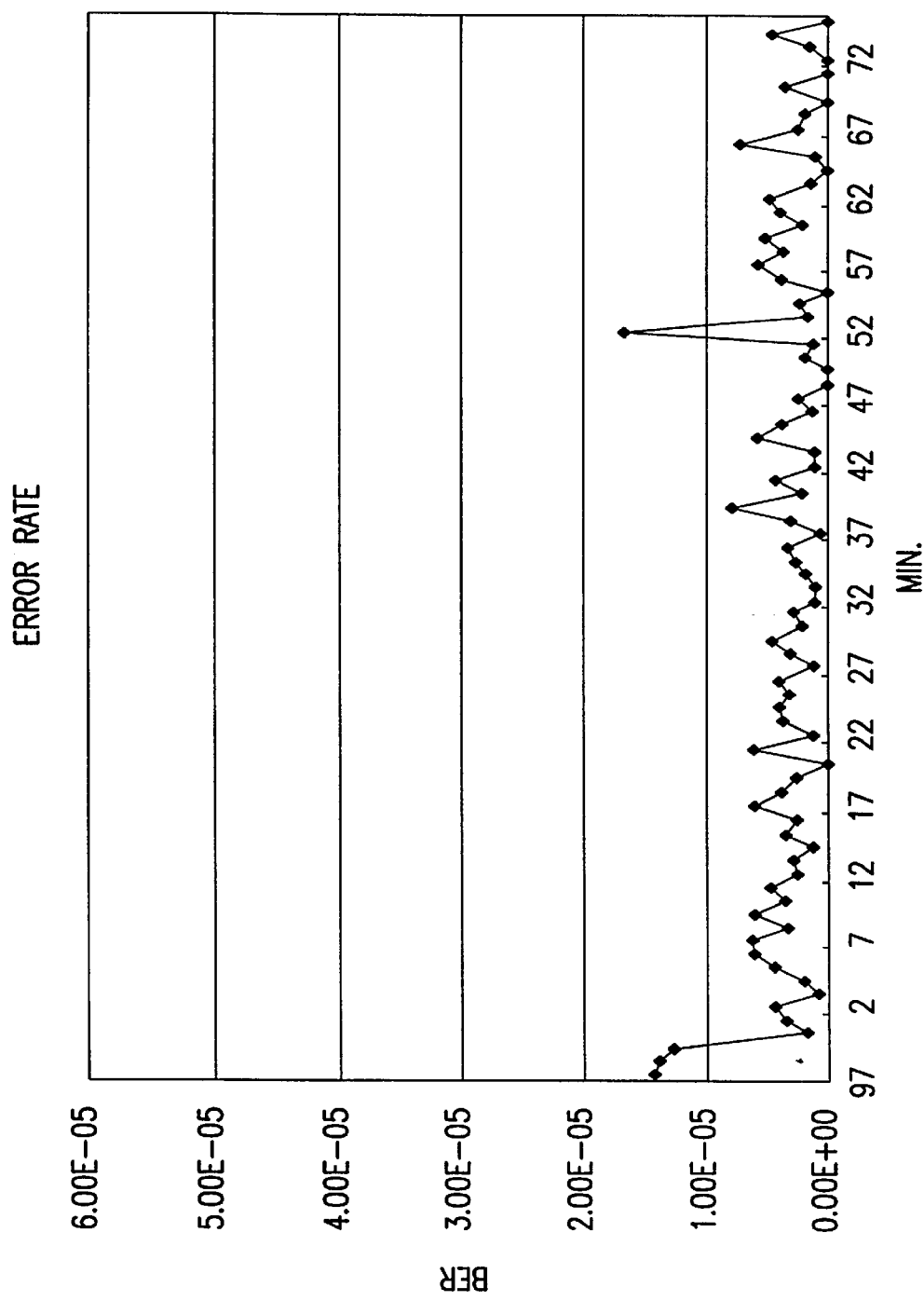
FIG. 4 is a graph based on experimental results showing the error rate of an optical recording media after re-initializing using changed parameters.
Figure 5:
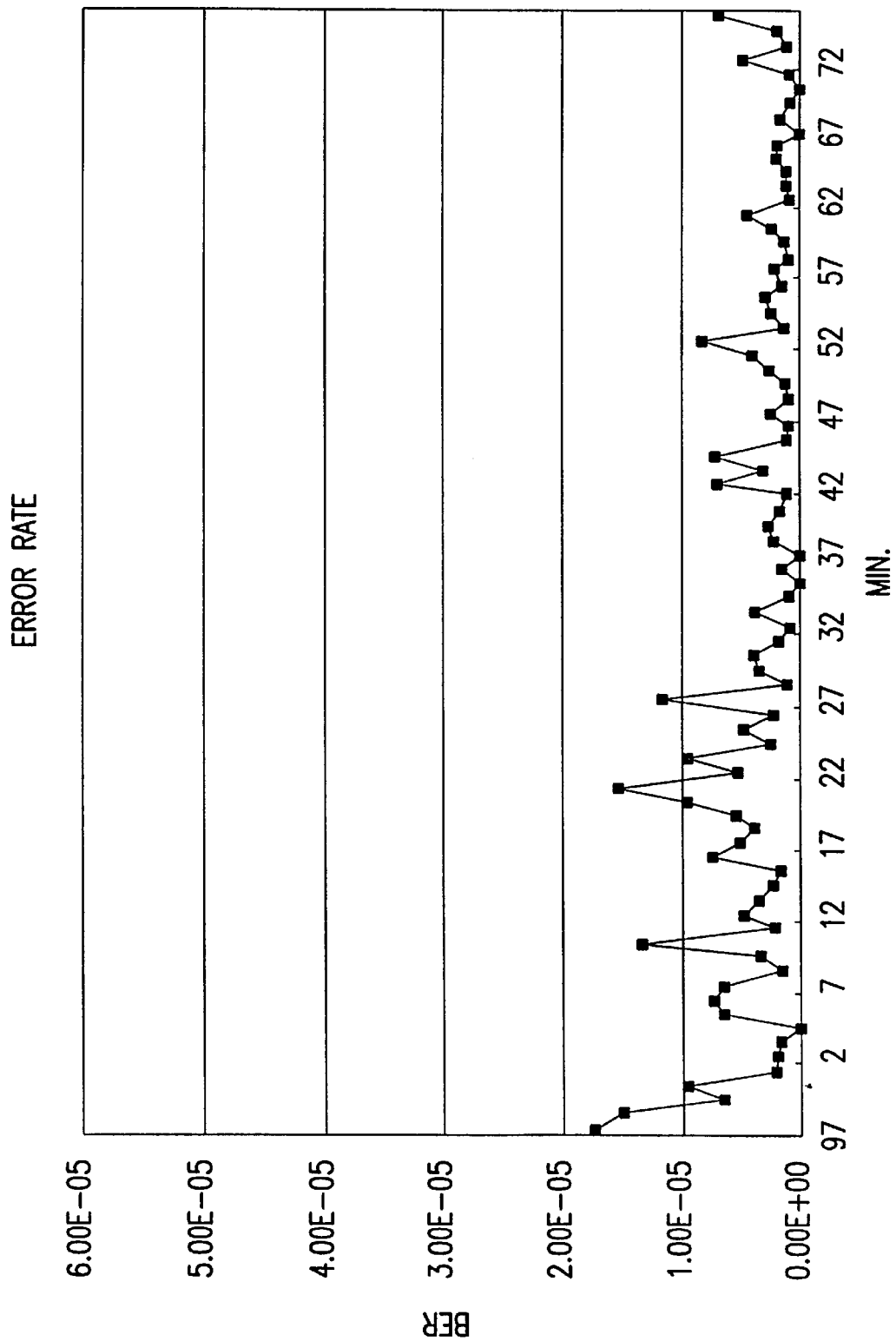
FIG. 5 is a graph based on experimental results showing the error rate of an optical recording media initialized in accordance with the present invention.

The efficiency of the present invention was determined experimentally. The results of the experiments are shown in FIGS. 3, 4 and 5.

A first protective layer, a recording layer, a second protective layer and a reflective layer were continuously formed on a polycarbonate substrate of 1.2 mm thickness with grooves of 0.5 $\mu$m width and a depth of 35 nm by a spattering apparatus. In the next step, a hard coat layer and an over coat layer were formed using a spin coat method and a phase-change optical disc is made. The first protective layer and the second protective layer were composed of ZnS—SiO2. The reflective layer was composed of aluminum alloy. After the recording layer was initialized, a printing layer was formed on the over coat layer.

The error rate of the phase-change optical disc was examined by a valuing machine with an optical pick-up device of 780 nm wave and NA 0.5. Keeping the read power 1.0 mW, the error rate of every 20 tracks was examined in mode of 1200 rpm and CLV.

Figure 3:
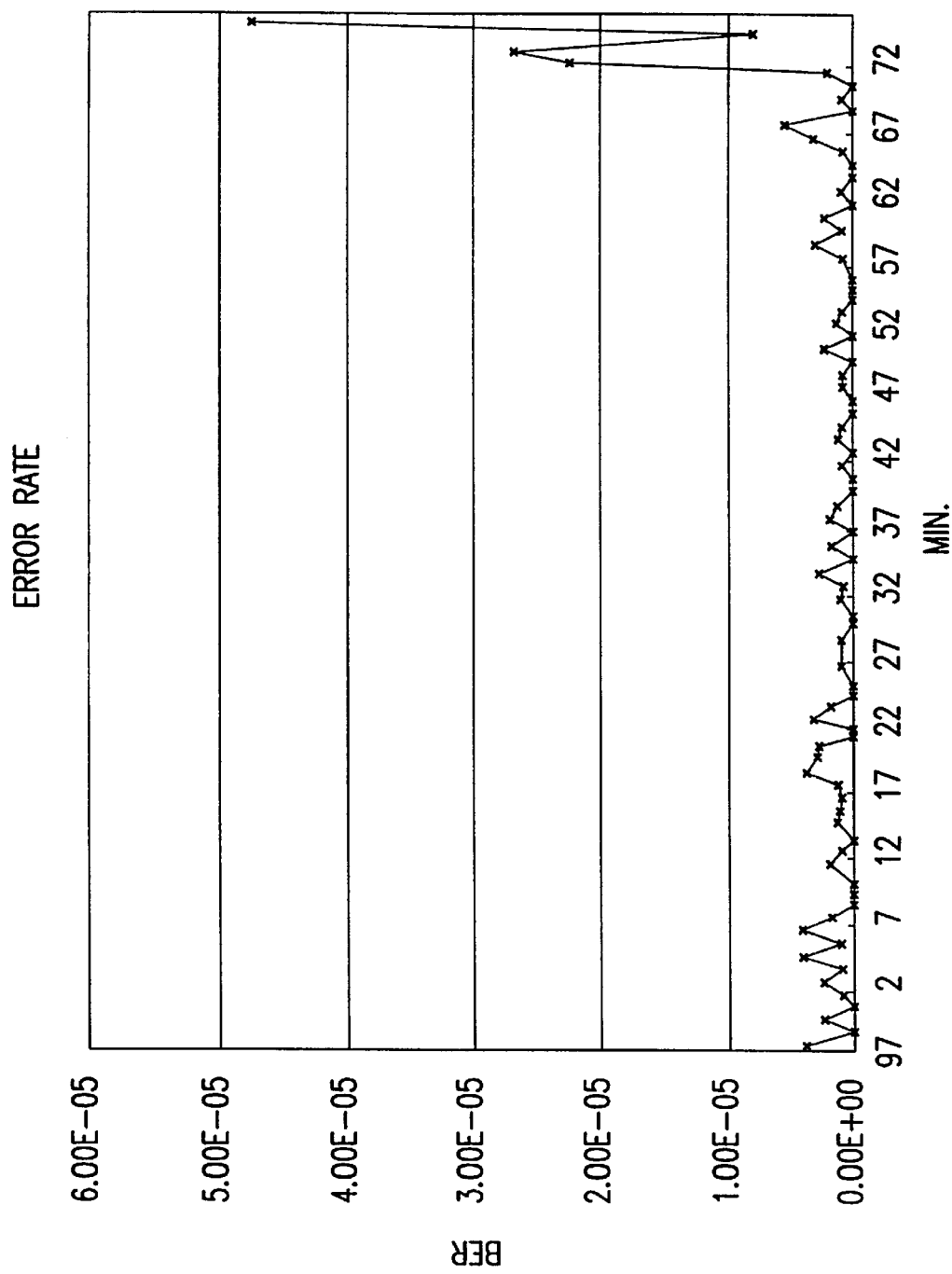
FIG. 3 is a graph based on experimental results showing the error rate of an optical recording media after initializing by a conventional method.

FIG. 3 shows a graph of the error rate when the disc was not cooling well after initializing and amorphous portions were generated around ATIP 70 min.

FIG. 4 shows the result of re-initializing the optical disc using different parameters. Amorphous portions generated around ATIP 70 min are restored perfectly.

FIG. 5 is a graph of the error rate of the initialized optical disc while adjusting the initializing conditions during initializing. This data indicates that this optical disc has low error rate on the whole surface.

As mentioned above, optical recording media can be uniformly produced. It is unnecessary to add another process examining an optical recording disc with amorphous portions. It is unnecessary to postpone the process time, and it is possible to remove errors.

In accordance with the present invention, initializing power can be adjusted in response to the reflective rate of the optical disc detected in the initializing process. Therefore, it is possible to manufacture and initialize optical recording media with a uniform reflective rate. It is possible to reduce error generation of recording and reproducing in a recording and reproducing apparatus.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts and steps, or a combination of both within the principles of the invention to the full extent indicated by the broad general meaning of the terms in which the appended claims are expressed.

The entire disclosures of Japanese Patent Applications Nos. 09-325808 and 10-60755, filed Nov. 27, 1997 and Mar. 12, 1998, respectively, are expressly incorporated herein by reference.

What is claimed is:

1. A method of operating an initializing apparatus, the method comprising the steps of:

driving an initializing light source for radiating an initializing light onto an optical recording medium;

rotating the optical recording medium;

moving the initializing light source in a radial direction relative to the optical recording medium;

detecting the intensity of light reflected by the optical recording medium; and performing the moving step as a function of the detected intensity of the reflected light.

2. The method of claim 1, wherein the intensity of the reflected light is detected based on the reflection of the initializing light.

3. The method of claim 1, wherein the reflected light is a reflection of light from a second light source, and wherein the second light source is different than the initializing light source.

4. The method of claim 1, further comprising the step of adjusting a driving power of the initializing light source as a function of the detected intensity of the reflected light.

5. A method of operating an initializing apparatus, the method comprising the steps of:

driving an initializing light source for radiating an initializing light onto an optical recording medium;

rotating the optical recording medium;

moving the initializing light source in a radial direction relative to the optical recording medium;

detecting the intensity of light reflected by the optical recording medium;

adjusting a driving power of the initializing light source as a function of the detected intensity of the reflected light; and repeating an initializing action on the optical recording medium as a function of the initialization condition of the recording medium.

6. A method of operating an initializing apparatus, the method comprising the steps of:

- driving an initializing light source for radiating an initializing light onto an optical recording medium;
- detecting the intensity of light reflected by the optical recording medium; and
- moving the initializing light source in a radial direction relative to the optical recording medium as a function of the detected intensity of the reflected light.

7. An initializing apparatus, comprising:

- a driver for driving an initializing light source for radiating an initializing light onto an optical recording medium;
- a first device for rotating the optical recording medium;
- a second device for moving the initializing light source in a radial direction relative to the optical recording medium; and
- a detector for detecting the intensity of light reflected by the optical recording medium, wherein the second device operates as a function of the detected intensity of the reflected light.

8. The initializing apparatus of claim 7, wherein the intensity of the reflected light is detected based on the reflection of the initializing light.

9. The initializing apparatus of claim 7, wherein the reflected light is a reflection of light from a second light source, and wherein the second light source is different than the initializing light source.

10. The initializing apparatus of claim 7, wherein the circuit further comprises a device for adjusting a driving power of the initializing light source as a function of the detected intensity of the reflected light.

11. An initializing apparatus, comprising:

- a driver for driving an initializing light source for radiating an initializing light onto an optical recording medium;
- a rotating device for rotating the optical recording medium;
- a moving device for moving the initializing light source in a radial direction relative to the optical recording medium; and
- a detector for detecting the intensity of light reflected by the optical recording medium, wherein the moving device operates as a function of the detected intensity of the reflected light; and
- a re-initialization system for repeating an initializing action on the optical recording medium as a function of the initialization condition of the recording medium.

* * * * *